US008960525B2

(12) United States Patent
Schick et al.

(10) Patent No.: US 8,960,525 B2
(45) Date of Patent: Feb. 24, 2015

(54) BRAZING PROCESS AND PLATE ASSEMBLY

(71) Applicant: General Electric Company, Schenectady, NY (US)

(72) Inventors: David Edward Schick, Greenville, SC (US); Srikanth Chandrudu Kottilingam, Simpsonville, SC (US); Johnie Franklin McConnaughhay, Greenville, SC (US); Brian Lee Tollison, Honea Path, SC (US); Yan Cui, Greer, SC (US)

(73) Assignee: General Electric Company, Schenectady, NY (US)

( * ) Notice: Subject to any disclaimer, the term of this patent is extended or adjusted under 35 U.S.C. 154(b) by 52 days.

(21) Appl. No.: 13/755,930

(22) Filed: Jan. 31, 2013

(65) Prior Publication Data
US 2014/0212208 A1 Jul. 31, 2014

(51) Int. Cl.
*B23K 31/02* (2006.01)
*B23K 1/20* (2006.01)
*B23K 1/00* (2006.01)

(52) U.S. Cl.
CPC .............. *B23K 1/20* (2013.01); *B23K 1/0018* (2013.01); *F05D 2230/237* (2013.01)
USPC ........ 228/175; 228/227; 228/233.2; 228/246; 228/254

(58) Field of Classification Search
None
See application file for complete search history.

(56) References Cited

U.S. PATENT DOCUMENTS

| 3,722,071 | A | * | 3/1973 | Van Orsdel | 228/181 |
|---|---|---|---|---|---|
| 3,768,148 | A | * | 10/1973 | Pagnotta et al. | 228/165 |
| 3,985,282 | A | * | 10/1976 | Miller et al. | 228/175 |
| 4,023,251 | A | * | 5/1977 | Darrow | 29/889.721 |
| 4,083,113 | A | * | 4/1978 | Miller et al. | 433/17 |
| 4,223,243 | A | * | 9/1980 | Oliver et al. | 313/268 |
| 4,224,086 | A | * | 9/1980 | Stokes et al. | 148/26 |
| 4,314,661 | A | | 2/1982 | DeCristofaro et al. | |
| 4,477,012 | A | * | 10/1984 | Holland et al. | 228/181 |
| 4,603,801 | A | * | 8/1986 | Wan et al. | 228/194 |
| 4,618,152 | A | * | 10/1986 | Campbell | 277/414 |
| 4,620,662 | A | | 11/1986 | Driggers | |

(Continued)

FOREIGN PATENT DOCUMENTS

| JP | 04-143066 A | * | 5/1992 |
|---|---|---|---|
| JP | 07-173611 A | * | 7/1995 |

(Continued)

OTHER PUBLICATIONS

European Search Report issued in connection with corresponding EP Application No. 14153184.8 on Jun. 5, 2014.

*Primary Examiner* — Kiley Stoner
(74) *Attorney, Agent, or Firm* — McNees Wallace & Nurick LLC

(57) ABSTRACT

A brazing process and plate assembly are disclosed. The brazing process includes positioning a braze foil on a first workpiece, then securing the braze foil to the first workpiece to form a brazable component, then positioning a second workpiece proximal to the brazable component, and then brazing the second workpiece to the brazable component. Additionally or alternatively, the brazing process includes positioning the braze foil on a tube, then securing the braze foil to the tube to form a brazable tube, then positioning a plate of a plate assembly proximal to the brazable tube, and then brazing the plate to the brazable tube. The plate assembly includes a plate and a tube brazed to the plate by a braze foil secured to the tube.

11 Claims, 5 Drawing Sheets

(56) References Cited

U.S. PATENT DOCUMENTS

| | | | |
|---|---|---|---|
| 4,655,384 A | 4/1987 | Rigdon et al. | |
| 4,716,959 A | 1/1988 | Aoki | |
| 4,886,203 A * | 12/1989 | Puzrin et al. | 228/126 |
| 5,158,229 A * | 10/1992 | Bose et al. | 228/262.1 |
| 5,251,374 A | 10/1993 | Halstead et al. | |
| 5,302,225 A * | 4/1994 | Padden | 156/309.3 |
| 5,309,637 A * | 5/1994 | Moriarty | 29/890.054 |
| 5,407,004 A * | 4/1995 | DeRisi et al. | 165/153 |
| 5,431,218 A | 7/1995 | Lelievre | |
| 5,617,992 A * | 4/1997 | Huddleston et al. | 228/183 |
| 5,639,014 A * | 6/1997 | Damiano et al. | 228/254 |
| 5,685,075 A | 11/1997 | Kato | |
| 5,782,638 A * | 7/1998 | Warren et al. | 433/206 |
| 5,823,247 A * | 10/1998 | Weibler | 165/76 |
| 6,000,461 A | 12/1999 | Ross et al. | |
| 6,119,920 A * | 9/2000 | Guthrie et al. | 228/123.1 |
| 6,129,257 A * | 10/2000 | Xu et al. | 228/44.3 |
| 6,262,477 B1 | 7/2001 | Mahulikar et al. | 257/698 |
| 6,302,318 B1 * | 10/2001 | Hasz et al. | 228/254 |
| 6,352,195 B1 * | 3/2002 | Guthrie et al. | 228/123.1 |
| 6,355,356 B1 * | 3/2002 | Hasz | 428/472 |
| 6,387,527 B1 * | 5/2002 | Hasz et al. | 428/472 |
| 6,399,217 B1 * | 6/2002 | Lee et al. | 428/611 |
| 6,426,152 B1 * | 7/2002 | Johnson et al. | 428/553 |
| 6,511,759 B1 * | 1/2003 | Schalansky | 428/576 |
| 6,544,623 B1 * | 4/2003 | Straza | 428/116 |
| 6,551,421 B1 | 4/2003 | Rabinkin | |
| 6,749,104 B2 | 6/2004 | Rabinkin | |
| 6,827,254 B2 * | 12/2004 | Hasz et al. | 228/246 |
| 6,871,774 B2 | 3/2005 | DeSalve | |
| 7,051,513 B2 | 5/2006 | McMullen et al. | |
| 7,377,419 B1 | 5/2008 | Howard et al. | |
| 7,685,716 B2 | 3/2010 | Rassmus et al. | |
| 7,755,292 B1 * | 7/2010 | Tuma et al. | 313/631 |
| 7,850,061 B2 * | 12/2010 | Rigal et al. | 228/193 |
| 8,127,443 B2 * | 3/2012 | Fint et al. | 29/889.22 |
| 2001/0006187 A1 * | 7/2001 | Hasz et al. | 228/119 |
| 2001/0019781 A1 * | 9/2001 | Hasz | 428/633 |
| 2002/0102409 A1 * | 8/2002 | Hasz et al. | 428/417 |
| 2002/0181523 A1 * | 12/2002 | Pinneo et al. | 372/43 |
| 2003/0062401 A1 * | 4/2003 | Hasz et al. | 228/254 |
| 2003/0192320 A1 * | 10/2003 | Farmer et al. | 60/804 |
| 2003/0209589 A1 * | 11/2003 | Hasz et al. | 228/165 |
| 2004/0056071 A1 * | 3/2004 | Pohlman | 228/175 |
| 2004/0124231 A1 * | 7/2004 | Hasz et al. | 228/245 |
| 2004/0155096 A1 * | 8/2004 | Zimmerman et al. | 228/248.1 |
| 2005/0217837 A1 * | 10/2005 | Kudija, Jr. | 165/165 |
| 2007/0017958 A1 * | 1/2007 | Hasz et al. | 228/101 |
| 2007/0160868 A1 | 7/2007 | Watanabe et al. | |
| 2007/0228112 A1 * | 10/2007 | Shi et al. | 228/181 |
| 2008/0141531 A1 * | 6/2008 | Paulino et al. | 29/889.22 |
| 2008/0145528 A1 * | 6/2008 | Deng et al. | 427/180 |
| 2008/0237312 A1 | 10/2008 | Watanabe et al. | |
| 2008/0263865 A1 * | 10/2008 | Daniels et al. | 29/889.71 |
| 2008/0292898 A1 * | 11/2008 | Straza | 428/574 |
| 2009/0032110 A1 * | 2/2009 | Straza | 137/1 |
| 2009/0049794 A1 * | 2/2009 | Barone et al. | 52/745.21 |
| 2009/0053548 A1 * | 2/2009 | Straza | 428/593 |
| 2009/0123709 A1 * | 5/2009 | Straza | 428/179 |
| 2009/0123776 A1 * | 5/2009 | Straza | 428/594 |
| 2009/0129999 A1 * | 5/2009 | Shimazu et al. | 422/190 |
| 2009/0200361 A1 * | 8/2009 | Knott et al. | 228/175 |
| 2011/0006663 A1 * | 1/2011 | Tuma et al. | 313/344 |
| 2011/0073102 A1 * | 3/2011 | Hanson et al. | 126/601 |
| 2011/0079635 A1 * | 4/2011 | Dumm et al. | 228/264 |
| 2011/0180199 A1 * | 7/2011 | Huxol et al. | 156/94 |
| 2011/0217484 A1 * | 9/2011 | Lubcke et al. | 427/569 |
| 2012/0028797 A1 * | 2/2012 | Kodama et al. | 502/439 |
| 2012/0214016 A1 * | 8/2012 | Van Dam et al. | 428/582 |
| 2012/0297616 A1 * | 11/2012 | Schroeder et al. | 29/840 |
| 2013/0202427 A1 * | 8/2013 | Macelroy | 415/208.1 |

FOREIGN PATENT DOCUMENTS

| | | | |
|---|---|---|---|
| JP | 08-141413 A | * | 6/1996 |
| JP | 2001347371 A | | 12/2001 |

* cited by examiner

US 8,960,525 B2

BRAZING PROCESS AND PLATE ASSEMBLY

FIELD OF THE INVENTION

The present invention is directed to fabrication processes and fabricated assemblies. More particularly, the present invention is directed to brazing processes and assemblies including brazed components.

BACKGROUND OF THE INVENTION

Brazing to fabricate certain components can present challenges. Some components can have joints between materials and/or portions of the component that require them to be secured to one another. Such components are present, for example, in tube-to-plate components, such as heat exchangers and micromixers.

Prior attempts to braze large amounts of such joints at one time (for example, between up to about 100 tubes being brazed to between about 2, 4, or more plates) have resulted in substantial and costly re-work. In part, such re-work is due to the tight tolerances (for example, gap ranges for nickel brazing being between about 0.0005 inches to about 0.004 inches). It is difficult to maintain tube and plate machining operations within these tolerances. Due to the tight tolerances, introducing additional sources of variation can be undesirable.

Due to the machining operations preventing the introduction of additional variation, additional variation introduced by brazing is especially undesirable. Known brazing processes use braze paste to secure tubes to plates. However, such braze paste must be manually applied, which can be expensive, can result in inconsistent placement of braze paste, can result in inconsistent quantity of the braze paste, and can often only be applied to one side of a component, which can be dependent upon capillary action of the braze paste flowing through a gap. The flow is, thus, dependent upon gap size, which can also vary. These inconsistencies can lead to variances exceeding defined tolerances. To remedy such variances, expensive re-brazing steps can be employed. Avoiding such re-brazing steps would be desirable.

A brazing process and a brazed component that do not suffer from one or more of the above drawbacks would be desirable in the art.

BRIEF DESCRIPTION OF THE INVENTION

In an exemplary embodiment, a brazing process includes positioning a braze foil on a first workpiece, then securing the braze foil to the first workpiece to form a brazable component, then positioning a second workpiece proximal to the brazable component, and then brazing the second workpiece to the brazable component. The securing includes plating, tack-welding, sintering, or a combination thereof.

In another exemplary embodiment, a brazing process includes positioning a braze foil on a tube, then securing the braze foil to the tube to form a brazable tube, then positioning a plate of a plate assembly proximal to the brazable tube, and then brazing the plate to the brazable tube. The securing includes plating, tack-welding, sintering, or a combination thereof.

In another exemplary embodiment, a plate assembly includes a plate and a tube brazed to the plate by a braze foil secured to the tube. The securing of the braze foil to the tube includes plating, tack-welding, sintering, or a combination thereof.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided is an exemplary brazing process and plate assembly. Embodiments of the present disclosure, for example, in comparison to brazing processes that do not include one or more of the features disclosed herein, improve yield of components within predetermined tolerances, reduce or eliminate costs associated with re-brazing, increase quality and strength of brazed joints (for example, due to increased precision of gaps), permit application of a controlled amount of braze material to a predetermined location (for example, a joint), provide about 100% first time yield, permit brazing in regions that are otherwise inaccessible (for example, for inspection), permit single-step brazing of complex assemblies, or a combination thereof.

Figure 1:
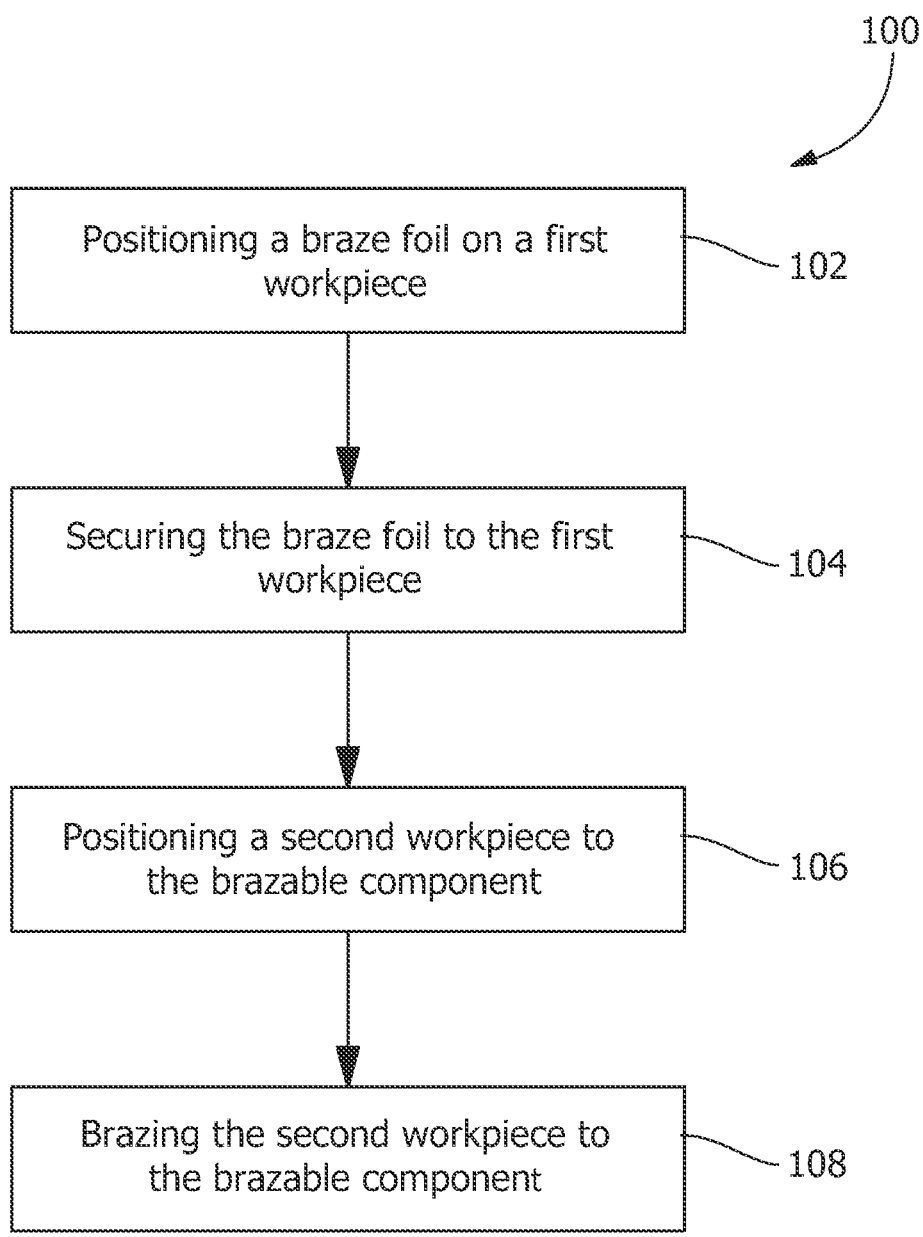
FIG. 1 shows a schematic view of an exemplary brazing process according to the disclosure.

Referring to FIG. 1, in one embodiment, a brazing process 100 includes positioning a braze foil on a first workpiece (step 102), then securing the braze foil to the first workpiece (step 104), thereby forming a brazable component, then positioning a second workpiece to proximal the brazable component (step 106), and then brazing the second workpiece to the brazable component (step 108). The securing (step 104) includes plating, tack-welding, sintering, or a combination thereof.

The braze foil is any suitable braze material, such as a nickel-based braze alloy. In one embodiment, the braze foil is a pre-sintered foil 54 as is further described below with reference to FIGS. 4-5. Suitable materials include, but are not limited to, a diffusion braze alloy having, by weight, about 79.9& Ni, about 15% Cr, about 3.6% B, and about 1.5% Fe, and a boron-free braze alloy having, by weight, about 70.9% Ni, about 19% Cr, and about 10.1% Si. In one embodiment, the braze foil has a predetermined braze temperature, for example, between about 1500° F. and about 2300° F., between about 1800° F. and about 2300° F., between about 2000° F. and about 2300° F., between about 2100° F. and about 2200° F., between about 2000° F. and about 2100° F., between about 1500° F. and about 1800° F., of about 1500° F., of about 1800° F., of about 2000° F., of about 2050° F., of about 2100° F., of about 2150° F., of any suitable combination, sub-combination, range, or sub-range therein.

The braze foil includes any suitable thickness permitting the brazing. In one embodiment, the braze foil has a thickness of about 2 mils. In one embodiment, the positioning of the braze foil (step 102) includes cutting the braze foil to a predetermined length and/or width. The cut braze foil is positioned in a predetermined location, such as a joint between one or more tubes (for example, having an outer diameter, such as, about ¼ inch) and one or more plates. Additionally or alternatively, a pre-cut braze foil having the predetermined length and/or width is used.

The tubes and plates include any suitable material, for example, stainless steel, a nickel-based alloy, an iron-based alloy, or any other suitable metal or metallic material. One suitable nickel-based alloy has a composition, by weight, of about 5% iron, between about 20% and about 23% chromium, up to about 0.5% silicon, between about 8% and about 10% molybdenum, up to about 0.5% manganese, up to about 0.1% carbon, and a balance nickel. Another suitable nickel-based alloy has a composition, by weight, of about 15.5% chromium, about 8% iron, up to about 0.5% silicon, about 1% manganese, up to about 0.15% carbon, up to about 0.5% copper, up to about 0.015% sulfur and, a balance of nickel. One suitable iron-based alloy has a composition, by weight, of up to about 0.003% carbon, up to about 2% manganese, up to about 0.045% phosphorus, up to about 0.03% sulfur, up to about 0.75% silicon, about 18% to about 20% chromium, between about 8% and about 12% nickel, up to about 0.1% nitrogen, and a balance of iron.

The securing (step 104) at least temporarily maintains the braze foil on the first workpiece in a predetermined position as the brazable component. Suitable techniques for the securing (step 104) include, but are not limited to, tack welding (for example, a poke tack or resistance spot weld) followed by sintering at a sintering temperature below braze temperature for the braze foil, electro plating, electroless plating, intermediate plating processes, or a combination thereof.

The securing (step 104) maintains the braze foil and the first workpiece as the brazable component in a predetermined position, enabling the brazable component to be positioned relative to the second workpiece.

In one embodiment, the securing (step 104) includes plating, such as, electroless plating and/or electro plating. In embodiments with the plating, the securing (step 104) includes masking steps for preventing plating of undesirable locations, includes application of intermediate layers (for example, a pure or substantially pure nickel layer).

In one embodiment, the securing (step 104) includes tack-welding followed by the sintering at the sintering temperature. In one embodiment, the sintering temperature is about 200° F. below the braze temperature, about 100° F. below the braze temperature, about 50° F. below the braze temperature, between about 50° F. and about 200° F. below the braze temperature, between about 50° F. and about 100° F. below the braze temperature, between about 100° F. and about 200° F. below the braze temperature, or any suitable combination, sub-combination, range, or sub-range therein. Additionally or alternatively, the sintering temperature is between about 1300° F. and about 2200° F., between about 1300° F. and about 2000° F., between about 1300° F. and about 1800° F., between about 1300° F. and about 1600° F., between about 1500° F. and about 1800° F., between about 1800° F. and about 2100° F., or any suitable combination, sub-combination, range, or sub-range therein.

In one embodiment, the securing (step 104) includes positioning the brazable component in a furnace for a predetermined duration, such as, between about 1 minute and about 30 minutes, between about 5 minutes and about 15 minutes, between about 5 minutes and about 10 minutes, between about 10 minutes and about 15 minutes, between about 15 minutes and about 30 minutes, about 1 minute, about 5 minutes, about 10 minutes, about 15 minutes, about 30 minutes or any suitable combination, sub-combination, range, or sub-range therein.

The second workpiece is positioned (step 106) with the brazable component according to any suitable techniques permitting insertion or assembly. Suitable techniques include, but are not limited to, using mechanical connections, using fasteners, using adhesives, using interlocking parts, using slots, using fixtures, or a combination thereof. In one embodiment with the second workpiece being a plate and the brazable component being a brazable tube, the brazable tube is inserted into the plate (or a plurality of plates or a portion of a plate assembly 11 as is described below with reference to FIG. 2), where the brazable tube is permitted to expand (for example, due to heat). The expansion locks the brazable tube into place, for example, prior to the initiation of the brazing (step 108).

The brazing (step 108) includes any suitable technique(s) and/or operational parameters, such as a brazing temperature and/or a brazing duration. In one embodiment, the brazing (step 108) is performed without use of brazing paste. In one embodiment, the brazing (step 108) is a single-step brazing step and permits consolidation of multiple brazing steps. In one embodiment, the brazing temperature is between about 1500° F. and about 2300° F., between about 1500° F. and about 2300° F., between about 1500° F. and about 1800° F., between about 2000° F. and about 2300° F., between about 1800° F. and about 2300° F., between about 1800° F. and about 2100° F., or any suitable combination, sub-combination, range, or sub-range therein. In one embodiment, the brazing duration is between about 1 minute and about 30 minutes, between about 5 minutes and about 30 minutes, between about 15 minutes and about 30 minutes, between about 20 minutes and about 30 minutes, about 10 minutes, about 15 minutes, about 20 minutes, about 30 minutes, or any suitable combination, sub-combination, range, or sub-range therein.

Figure 2:
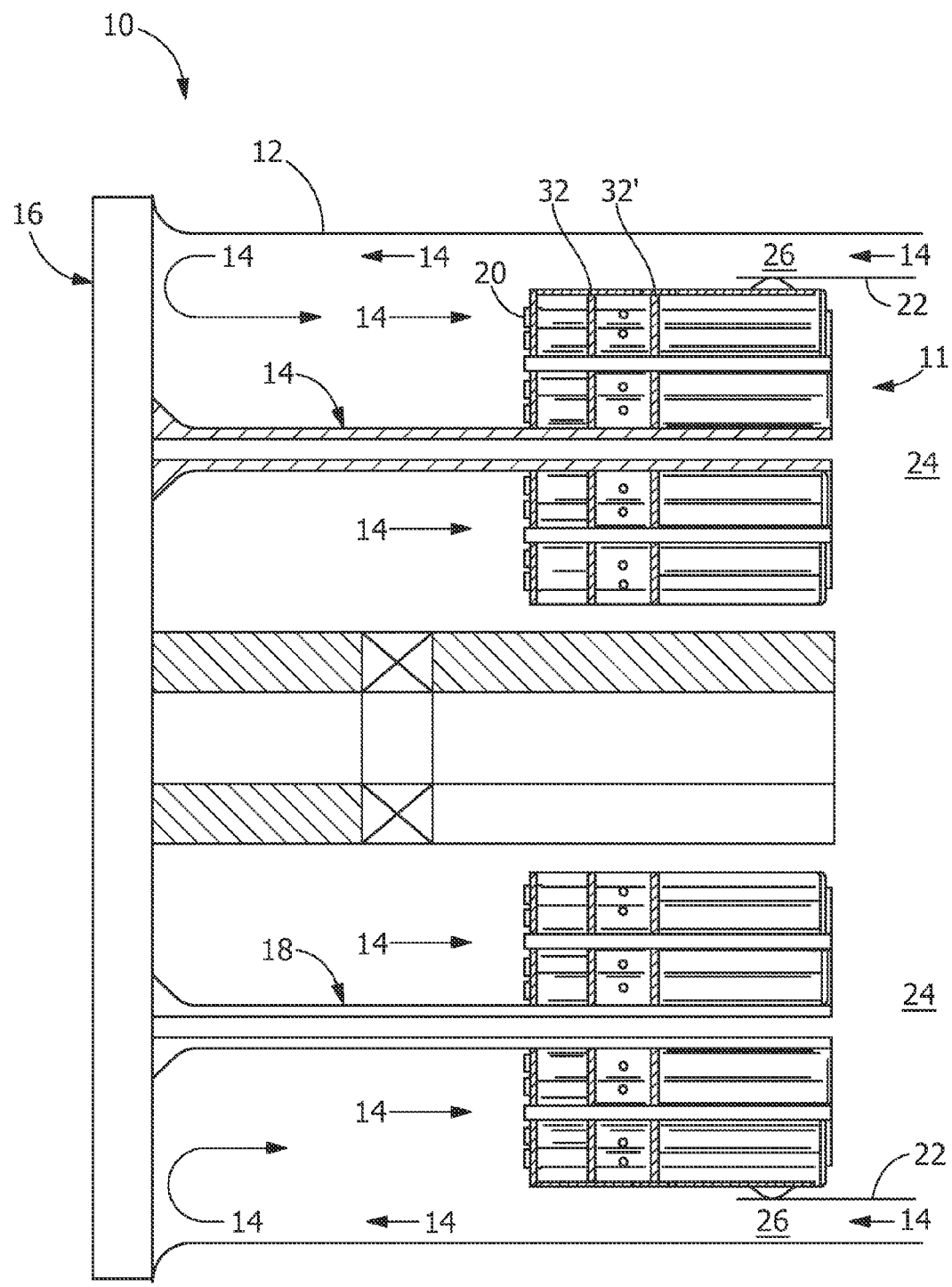
FIG. 2 shows a cross-sectional view of an exemplary plate assembly in a combustor according to the disclosure.

Referring to FIG. 2, in one embodiment of the plate assembly 11 formed by the process 100, the first workpiece is a tube 20 formed by the brazable component being a brazable tube and the second workpiece being a plate 32. For example, a casing 12 generally surrounds a combustor 10 that forms at least a portion of the plate assembly 11 and contains a working fluid 14 flowing to the combustor 10. The casing 12 includes an end cover 16 at one end to provide an interface for supplying fuel, diluent, and/or other additives to the combustor 10. Fluid conduits 18 extend generally axially from the end cover 16 to the tubes 20. The fluid conduits 18 are in fluid communication with the tubes 20 and a fuel source (not shown).

In one embodiment, a liner 22 generally surrounds at least a portion of the tubes 20 and extends generally downstream from the tubes 20. The liner 22 at least partially defines a combustion chamber 24 downstream from the tubes 20. The casing 12 circumferentially surrounds the tubes 20 and/or the liner 22, for example, to define an annular passage 26 that at least partially surrounds the tubes 20 and the liner 22. This permits the working fluid 14 to flow through the annular passage 26 along the outside of the liner 22 to provide convective cooling to the liner 22. When the working fluid 14 reaches the end cover 16, the working fluid 14 reverses direction and flows through at least a portion of the tubes 20 where it mixes with the fuel before it is injected into the combustion chamber 24. The tubes 20 generally include an upstream end 28 axially separated from a downstream end 30. The tubes 20 are brazed to one or more of the plates 32. The plates 32 extend generally radially and circumferentially.

Figure 3:
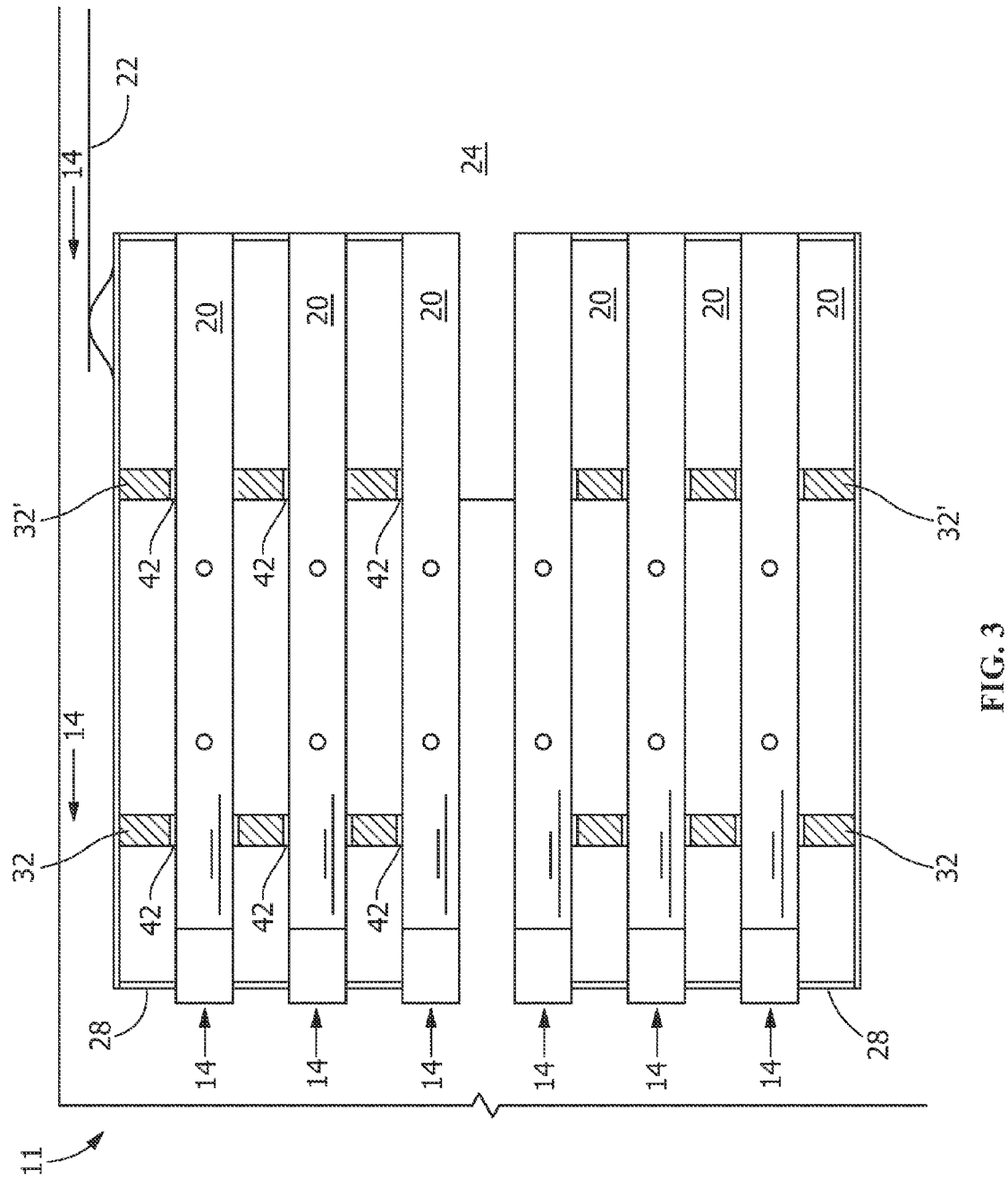
FIG. 3 shows an enlarged view of an embodiment of the plate assembly in the combustor shown in FIG. 2 according to the disclosure.

FIG. 3 shows an enlarged schematic view of the plate assembly 11 in the combustor 10 shown in FIG. 2. In one embodiment, passages 42 extend generally axially through the plates 32. The passages 42 are of any size or shape. The tubes 20 extend generally axially through the plates 32. The particular shape, size, number, and arrangement of the tubes 20 correspond to operational parameters of the combustor 10.

Figure 4:
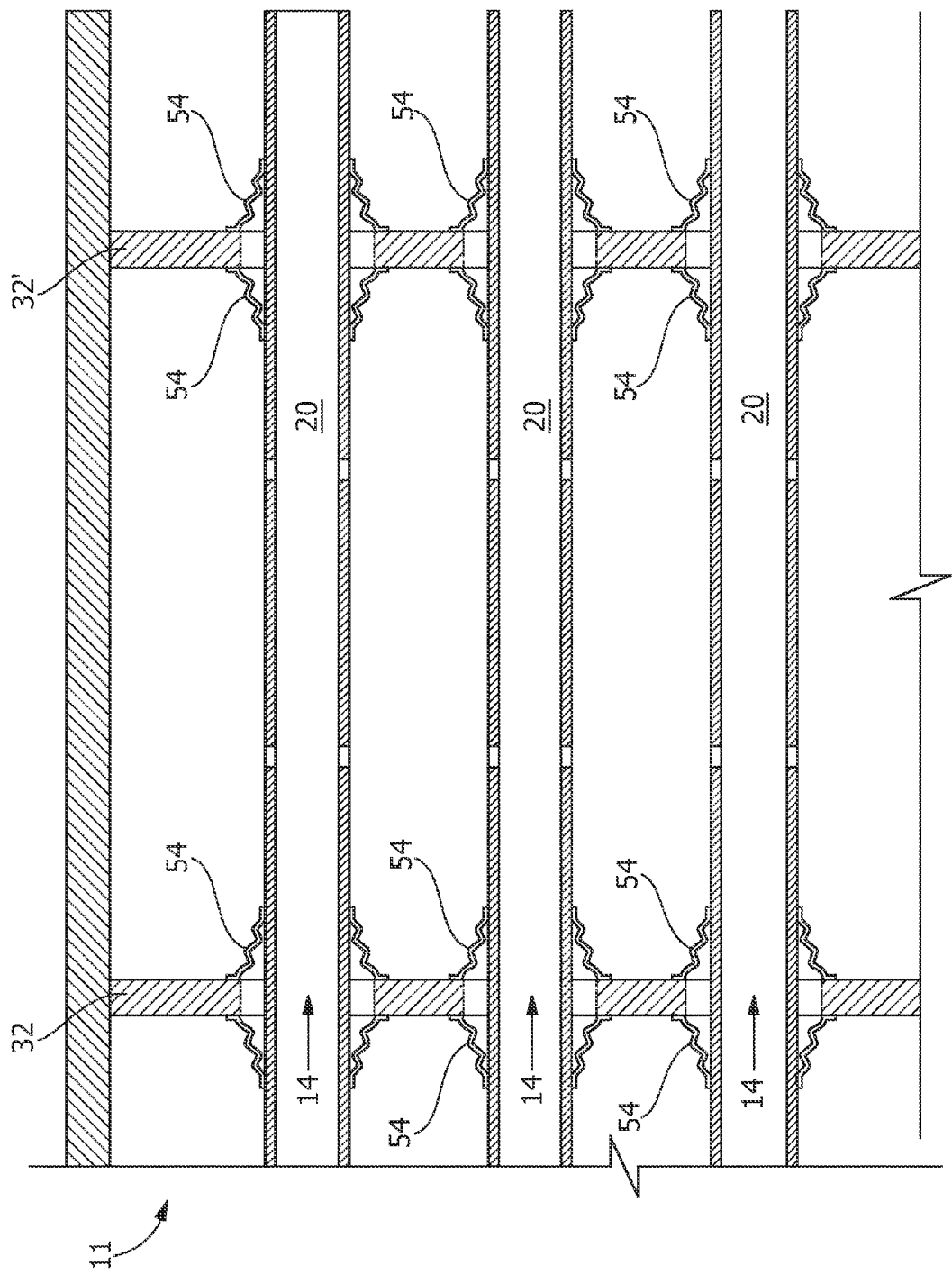
FIG. 4 shows an enlarged view of an embodiment of the plate assembly in the combustor shown in FIG. 2 according to the disclosure.
Figure 5:
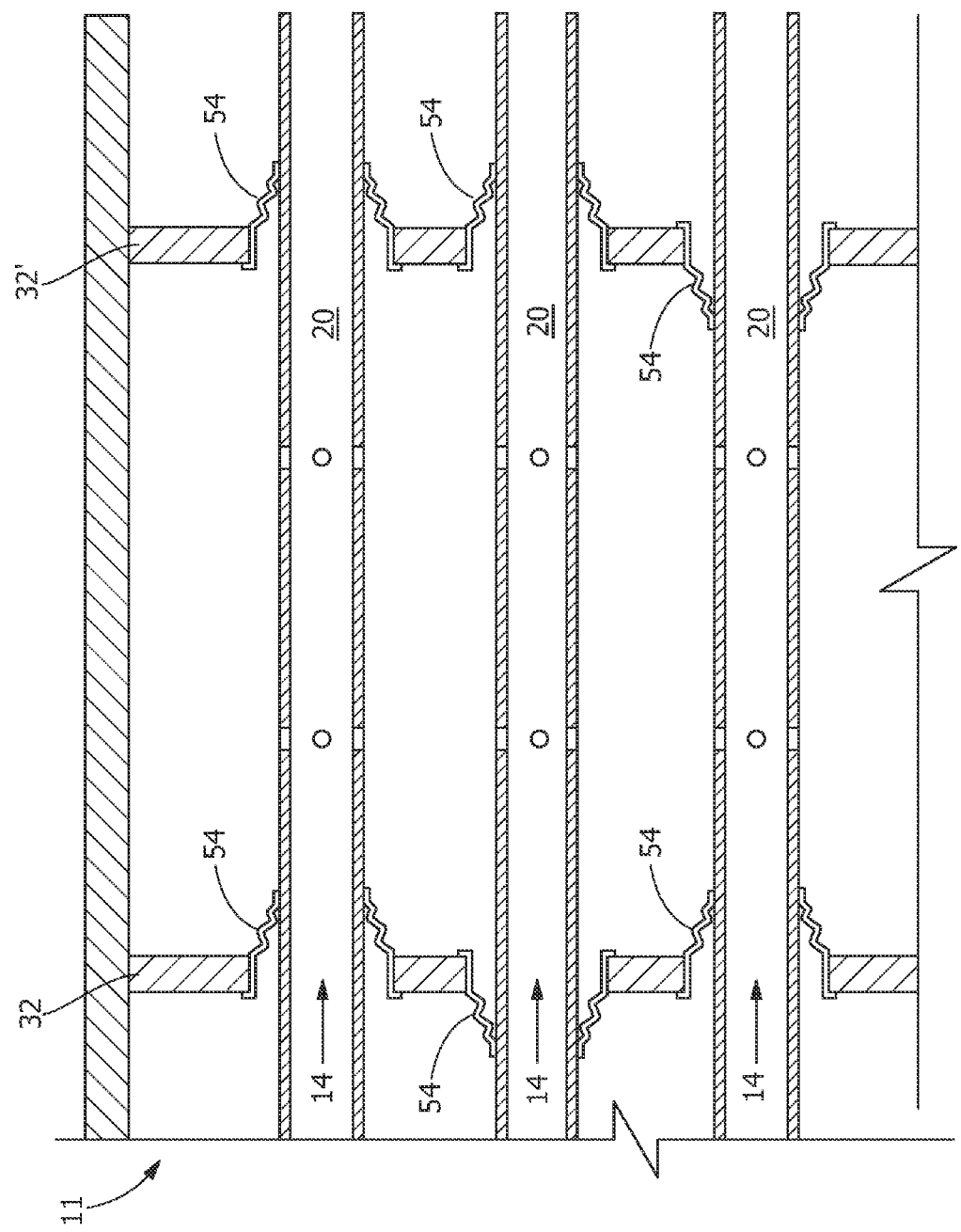
FIG. 5 shows an enlarged view of an embodiment of the plate assembly in the combustor shown in FIG. 2 according to the disclosure.

The plate assembly 11 includes any features suitable for micromixers, heat exchangers, and/or other applications. FIGS. 4-5 show enlarged schematic views of embodiments of the plate assembly 11 in the combustor 10 shown in FIG. 2. In one embodiment, the plate assembly 11 includes the pre-sintered foils 54 at least partially surrounding one or more portions of the tubes 20 and connecting the tubes 20 to the plates 32 by the brazing (step 108). In one embodiment, the tubes 20 and the plates are arranged in one or more T-shaped joints, for example, about four joints, about six joints, about twelve joints, or any other suitable number. In a further embodiment, the pre-sintered foils 54 seal the tubes 20 from fluid leaks.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A brazing process, comprising:
   positioning a braze foil on a first workpiece; then
   securing the braze foil to the first workpiece to form a brazable component; then
   positioning a second workpiece proximal to the brazable component; and then
   brazing the second workpiece to the brazable component;
   wherein the securing is by tack-welding followed by heating, the heating being between 1,300° F. and 2,200° F., at a temperature below the braze temperature of the brazable component, and for a period of between about 1 minute to about 30 minutes.

2. The brazing process of claim 1, wherein the securing is in a furnace, the furnace having a temperature within 200° F. of the braze temperature for the braze foil.

3. The brazing process of claim 1, further comprising cutting the braze foil to a predetermined length prior to the positioning of the braze foil.

4. The brazing process of claim 1, wherein the brazing is for a brazing duration, the brazing duration being between about 1 minute and about 30 minutes.

5. The brazing process of claim 1, wherein the brazable component is a brazable tube.

6. The brazing process of claim 1, comprising installing the brazable component into a plate assembly.

7. The brazing process of claim 6, wherein the installing includes mechanical locking of the brazable component into the plate assembly.

8. The brazing process of claim 6, wherein the plate assembly is arranged and disposed to contain a fluid.

9. The brazing process of claim 8, wherein the plate assembly is devoid of fluid leaks.

10. The brazing process of claim 8, comprising inspecting the plate assembly for fluid leaks.

11. A brazing process, comprising:
    positioning a braze foil on a tube; then
    securing the braze foil to the tube to form a brazable tube; then
    positioning a plate of a plate assembly proximal to the brazable tube; and then
    brazing the plate to the brazable tube;
    wherein the securing is by tack-welding followed by heating, the heating being between 1,300° F. and 2,200° F., at a temperature below the braze temperature of the brazable component, and for a period of between about 1 minute to about 30 minutes.

* * * * *